(12) United States Patent
Mestan

(10) Patent No.: US 10,053,585 B2
(45) Date of Patent: Aug. 21, 2018

(54) FLAME-RETARDANT POLYMER COMPOSITION

(71) Applicant: Bategu Gummitechnologie GmbH & Co. KG, Vienna (AT)

(72) Inventor: Gerhard Mestan, Vienna (AT)

(73) Assignee: BATEGU Gummitechnologie GmbH, Vienna (AT)

( * ) Notice: Subject to any disclaimer, the term of this patent is extended or adjusted under 35 U.S.C. 154(b) by 564 days.

(21) Appl. No.: 14/419,189

(22) PCT Filed: Jul. 31, 2013

(86) PCT No.: PCT/AT2013/050149
§ 371 (c)(1),
(2) Date: Feb. 2, 2015

(87) PCT Pub. No.: WO2014/019008
PCT Pub. Date: Feb. 6, 2014

(65) Prior Publication Data
US 2015/0203693 A1    Jul. 23, 2015

(30) Foreign Application Priority Data
Aug. 2, 2012  (AT) .............................. A 50308/2012

(51) Int. Cl.
*C09D 5/18*    (2006.01)
*C09D 123/32*    (2006.01)
(Continued)

(52) U.S. Cl.
CPC .................. *C09D 5/18* (2013.01); *C08L 7/00* (2013.01); *C08L 9/00* (2013.01); *C08L 9/02* (2013.01);
(Continued)

(58) Field of Classification Search
CPC ........ C08K 3/016; C08K 5/0066; C09D 5/18; C09D 123/32; C08L 31/04;
(Continued)

(56) References Cited

U.S. PATENT DOCUMENTS 4,894,408 A  *  1/1990  Hazelton ............. C08L 23/0853
                                                            524/425
5,011,163 A     4/1991  Hermann et al.
(Continued)

FOREIGN PATENT DOCUMENTS

CN        1087651        11/1993
DE        38 31 894        5/1990
(Continued)

OTHER PUBLICATIONS

International Search Report issued by the European Patent Office in International Application PCT/AT2013/050149 dated Oct. 18, 2013.
(Continued)

*Primary Examiner* — Vu A Nguyen
(74) *Attorney, Agent, or Firm* — Henry M. Feiereisen LLC

(57) ABSTRACT

The invention relates to a flame-proofed polymeric composition suitable for coating workpieces, containing a vinyl acetate-containing thermoplastic polymer and an unsaturated elastomer containing double bonds as polymeric components, wherein the polymeric components are present in the form of a homogeneous polymeric mixture, and a mixture matrix vulcanized exclusively by a sulphur or sulphur-containing crosslinking system is formed, wherein the sulphur crosslinking system extends across the entire matrix and permeates the matrix completely, and—at least one flame retardant or a combination of flame retardants. The invention further relates to articles produced therefrom, (Continued)

and to composite elements coated with this composition and to a method for producing the same.

61 Claims, 3 Drawing Sheets

(51) Int. Cl.
C08L 31/04 (2006.01)
C08L 23/32 (2006.01)
C08L 9/00 (2006.01)
C08L 23/16 (2006.01)
C08L 7/00 (2006.01)
C08L 9/02 (2006.01)
C08L 9/06 (2006.01)
C09D 7/61 (2018.01)
C09D 7/48 (2018.01)

(52) U.S. Cl.
CPC ............... C08L 9/06 (2013.01); C08L 23/16 (2013.01); C08L 23/32 (2013.01); C09D 7/48 (2018.01); C09D 7/61 (2018.01); C09D 123/32 (2013.01); C08L 2201/02 (2013.01); C08L 2201/08 (2013.01); C08L 2205/03 (2013.01); Y10T 428/24802 (2015.01); Y10T 428/269 (2015.01); Y10T 428/31649 (2015.04); Y10T 428/31837 (2015.04); Y10T 428/31924 (2015.04); Y10T 442/2631 (2015.04)

(58) Field of Classification Search
CPC ...... C08L 23/0853; C08L 23/16; C08L 23/32; C08L 2201/02; C08L 2205/02; C08L 2205/04
See application file for complete search history.

(56) References Cited

U.S. PATENT DOCUMENTS

| 5,284,889 A | 2/1994 | Pyun et al. |
| 2005/0113500 A1 | 5/2005 | Okoshi et al. |
| 2010/0183856 A1 | 7/2010 | Kind |
| 2011/0166279 A1* | 7/2011 | Basfar .................. H01B 7/295 524/404 |
| 2012/0252954 A1 | 10/2012 | Grun et al. |

FOREIGN PATENT DOCUMENTS

| DE | 41 29 741 | 3/1993 |
| DE | 102009060440 | 6/2011 |
| EP | 0 357 322 | 3/1990 |
| EP | 2 343 334 | 7/2011 |
| JP | 02-113046 | 4/1990 |
| JP | 05-194801 | 8/1993 |
| JP | 10-088074 | 4/1998 |
| JP | 2006-078688 | 3/2006 |
| RU | 2 266 917 | 12/2005 |
| RU | 2009 139 783 | 11/2011 |
| WO | WO 2010/069842 | 6/2010 |

OTHER PUBLICATIONS

Andreas Roos: Mobility, Levapren (EVM0 in automotive and mass transit applications, in: Lanxess Customer Event, India, 2012.
Bayer: :Handbuch für die Gummi-Industrie (Handbook for the Rubber Industrie), pp. 132-153, Jun. 1991, Germany.
Werner Hofmann: Kautschuk-Technologie (Rubber Technology), pp. 158-159, Centner Verlag Stuttgart, 1980.
Meisenheimer: "KA-Anwendungstechnik", in: Bayer AG Geschäftsbereich Kautschuk, Sep. 1992.

* cited by examiner

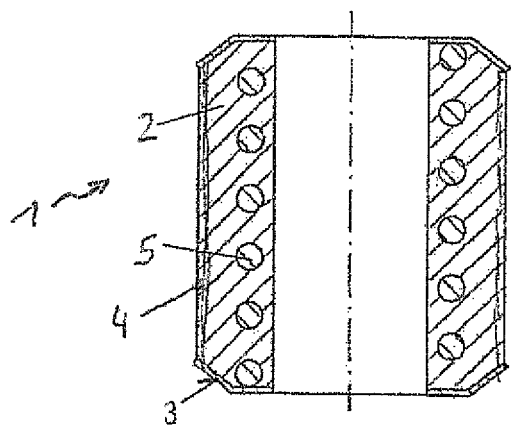
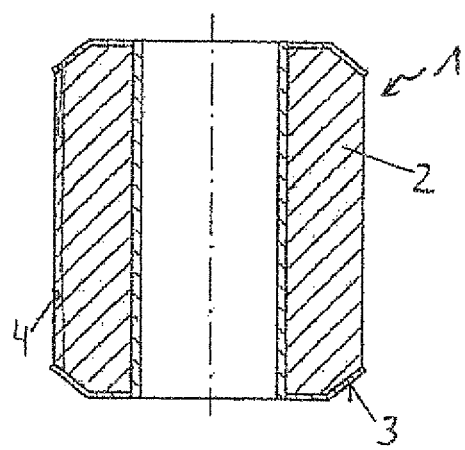
Fig. 1    Fig. 2
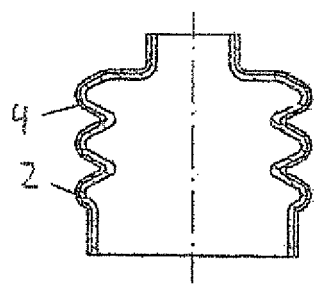
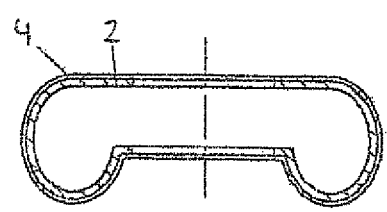
Fig. 3    Fig. 4
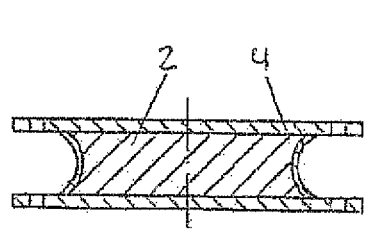
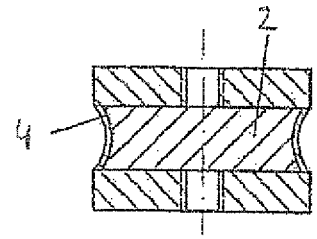
Fig. 5    Fig. 6

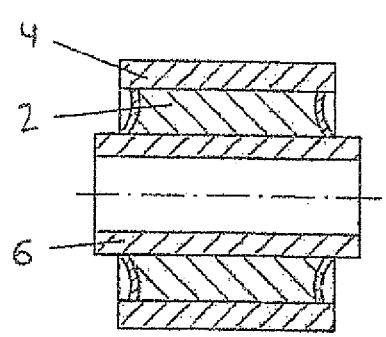
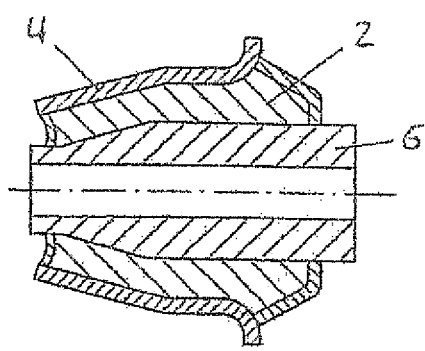
Fig. 7    Fig. 8
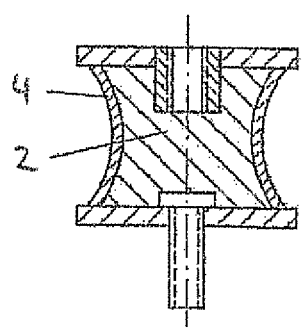
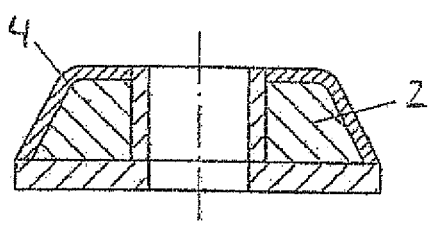
Fig. 9    Fig. 10
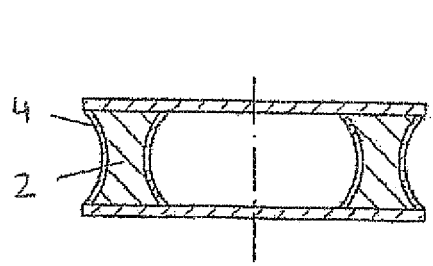
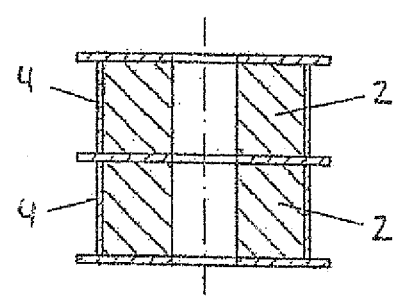
Fig. 11    Fig. 12

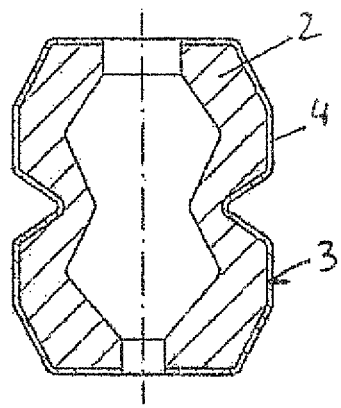
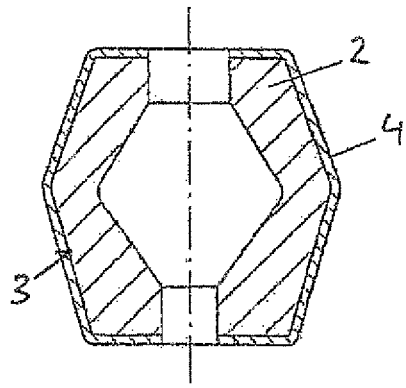
Fig. 13    Fig. 14
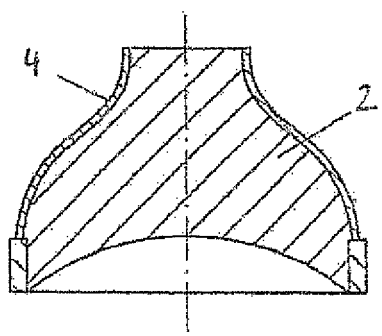
Fig. 15
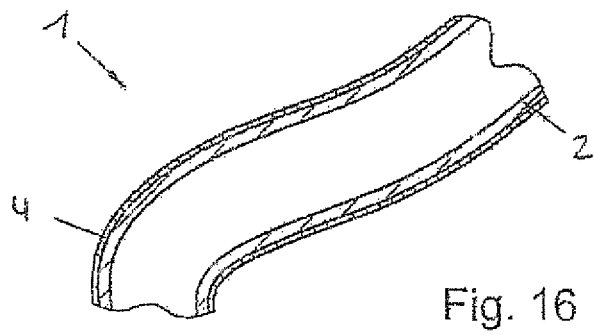
Fig. 16

FLAME-RETARDANT POLYMER COMPOSITION

CROSS-REFERENCES TO RELATED APPLICATIONS

This application is the U.S. National Stage of International Application No. PCT/AT2013/050149, filed Jul. 31, 2013, which designated the United States and has been published as International Publication No. WO 2014/019008 and which claims the priority of Austrian Patent Application, Serial No. A50308/2012, filed Aug. 2, 2012, pursuant to 35 U.S.C. 119(a)-(d).

BACKGROUND OF THE INVENTION

The invention concerns a flame-retardant polymer composition containing a thermoplastic polymer that contains vinyl acetate and an unsaturated elastomer as polymer components, as well as at least one flame retardant. The invention further concerns a method for producing this composition, articles made from this composition, as well as elastic composite elements having a base that has a coating consisting of this composition in at least some parts or sections of its outer surface.

Elastic elements, e.g., consisting of rubber, have no inherent flame-retardant properties as are required in some uses, in some cases pursuant to applicable law or standards. However, it is known to mix flame retardants into elastomers or (natural) rubber; however, the admixture of such additives commonly significantly reduces the elastic properties, meaning that such an element consisting of rubber cannot provide the required elastic properties in terms of desired static and dynamic properties. When used as a spring or damping element, or as a similar element, normally subject to highly dynamic stresses, e.g. in vehicles, the fire safety provisions cannot be fully met with known elastic elements.

As a result, flame-retardant coatings have come to be provided, whilst keeping the base protected by the coating free of flame retardants. Such composite elements are described, e.g., in DE 38 31 894 A1 or WO 2010/069842.

The crosslinking system is essential for the properties of an elastomer. Only the crosslinking system converts the flowable rubber into an elastomeric material that has the typical elastomeric properties, resulting in the fundamental differences from thermoplastic polymers. The type of crosslink bridge and crosslink density influence the hardness, modulus, resistance, elongation at break, tear resistance, elasticity, and the limits of its capacity to resist mechanical and thermal stresses. Additionally, polymeric compositions containing a flame retardant are known from the prior art, e.g. mixtures of ethylene vinyl acetate with ethylene-propylene-diene monomer rubber. These mixtures are either silane-crosslinked, or in most cases, crosslinked via peroxides or radiation. Such mixtures are used primarily as coatings for cables or electrical lines. Thus, for example, EP 2 343 334 A2 discloses flame-retardant compositions consisting of EVA, EPDM, and LLDPE that have a peroxide crosslinking system formed by di-cumyl peroxide. Peroxides are frequently used to crosslink rubbers. Peroxide crosslinking is the typical type of crosslink in order to crosslink rubbers without double bonds, and/or in order to obtain a particularly high crosslink density or close mesh of the crosslink, which has a positive influence on the mechanical indicators, such as the compression set, in particular at high temperatures. The often high crosslink density and the short crosslink bonds usually result in lower ultimate elongation compared to materials having the same hardness. If the surfaces of the products are no longer processed, the peroxide crosslink requires the removal of ambient oxygen during crosslinking. However, such crosslinking systems are disadvantageous for the elastic and dynamic properties, particular if large amounts of flame retardants are additionally included.

In order to obtain flame resistance, in particular under standard CEN TS 45545-2, with the related high demands on flame propagation, optical smoke density, smoke gas toxicity, and heat release rate, requires particular attention to be paid to the selection of the polymers. The smoke density and toxicity requirements, for example, rule out the use of polymers containing halogen.

SUMMARY OF THE INVENTION

Thus, the objective of the invention is to overcome these disadvantages and to provide a flame-retardant polymer material combining extraordinary fire safety properties with good mechanical indicators, and that thus maintains good mechanical, elastic, and dynamic properties despite a high degree of filling with flame retardants.

This objective is met by the characteristics of claim 1. According to the invention, it is provided that the flame-retardant polymer composition contains at least one thermoplastic polymer containing vinyl acetate as well as at least one unsaturated elastomer containing double bonds as polymer components, whereby the polymer components are present as a homogeneous polymer mixture. The polymer mixture is not peroxidic; rather, it consists exclusively of a mixture matrix vulcanised by means of a sulphur crosslinking system or one containing sulphur, whereby the sulphur crosslinking system extends over the entire matrix and completely permeates or pervades the matrix, or the sulphur bonds extend over the entire matrix. Additionally, it contains at least one flame retardant or a combination of flame retardants. The selection of this type of crosslink results in a special partial crosslinking of the rubber mixture. Because the polymer containing vinyl acetate cannot be crosslinked with sulphur and this part of the polymer is not crosslinked, surprisingly, the system has a surprisingly high capacity to be filled with flame retardants, whilst, simultaneously, the typical rubber properties, in particular high, reversible extensibility, are only affected to a small degree. At the same time, the non-crosslinked polymer component makes its contribution to flame protection. This results in a composition that protects a dynamically stressed component coated with it such that the entire component is sufficiently flame retardant, and, in particular, meets the fire safety standard CEN TS 45545-2, without the coating having a noticeable adverse effect on the dynamic properties of the composite element over its lifetime.

This is also a significant difference from dynamically crosslinked thermoplastic elastomers (TPE-V). These are biphasic systems in which finely dispersed rubber particles are embedded in a continuous thermoplastic matrix. By contrast, the polymer mixture according to the invention is homogeneous, and the polymer components are closely mixed with one another and form the most uniform mixture matrix possible. Additionally, in crosslinked, thermoplastic elastomers, only the dispersed rubber particles are crosslinked as such, and there are generally no sulphur bonds between the elastomer particles. By contrast, in the composition according to the invention, a sulphur crosslinking system is formed that completely permeates the entire matrix. Here, appropriate sulphur bonds are formed with one or more sulphur atoms and any bridges between the chains of the unsaturated elastomers that are in the matrix. No sulphur bonds can form between the polymer chains containing vinyl acetate because there are no double bonds. The polymer chains containing vinyl acetate remain non-crosslinked are also not crosslinked by other means, e.g., peroxide or radiation. This allows for simple good filling. Nonetheless, the sulphur crosslinking system extends over the entire matrix, and the sulphur bonds extend through the entire matrix and also surround the parts and chains of the polymer containing vinyl acetate. In this way, the elastomeric properties are preserved, or the entire material of the component can be considered an elastomer. The thermoplastic properties become secondary, or are entirely absent, due to the complete sulphur crosslinking. In this way, a material is produced that can be used, in particular, as a coating, and has extraordinary fire safety properties along with good mechanical indicators, such that the dynamic properties of a component coated with this coating are not noticeably adversely affected over its lifetime.

Additional advantageous configurations and further developments of the composition can be seen from the characteristics of the dependent claims.

Thus, it is advantageous for the thermoplastic polymer containing vinyl acetate to remain non-crosslinked, and for the unsaturated elastomer containing double bonds to be at least partially sulphur-vulcanised and crosslinked in whole or in part via sulphur bonds, in particular mono-, di-, and/or polysulphide bonds whereby the polymer mixture remains free of other, in particular peroxide, crosslinks. This provides even better capacity for filling with flame retardants whilst maintaining the advantageous dynamic properties, in particular high, reversible extensibility. According to an advantageous configuration, it is provided for the sulphur bonds to consist of both polysulphide and mono-and disulphide bonds, whereby the content of the polysulphide bonds is between 40 and 50%, preferably 45%, and the content of the mono- and di-sulphide bonds is between 50 and 60%, preferably 55%. The percentages refer to the total crosslink density in mol/cm$^3$. The percentage ratio of the polysulphide bond content to the mono- and di-sulphide bond content is thus 40-50:50-60, in particular 45:55. In this way, high degrees of fill and good elastomeric properties can be obtained.

If, because it is provided for the polymer components to form a substantially, both macroscopically and microscopically and light microscopically, monophasic, homogeneous mixture, in particular without phase separations visible to the naked eye and/or on a light microscope, particularly advantageous mechanical properties result for the polymer, in particular with regard to its elastic and dynamic characteristics. This refers to the fact that the mixture is advantageously so monophasic that no elastomer particles with a mean particle density of more than 0.5 microns, in particular more than 0.1 microns, preferably more than 0.01 microns, and/or no rubber domains with a mean diameter of more than 0.5 microns, in particular more than 0.1 microns, preferably more than 0.01 microns are present in the mixture and/or the final composition. In particular, there are no recognisable or detectable polymer particles or rubber domains.

In this regard, it is particularly advantageous for the vulcanised polymer mixture to have only elastomeric, and no thermoplastic, properties, and for the vulcanised polymer mixture or the composition to have—in particular primarily—elastomeric properties both in the temperature range of use and up to elevated temperatures, for short periods even 150-200° C. This is also a significant difference from crosslinked thermoplastic elastomers (TPE-V).

Crosslinked thermoplastic elastomers produced by dynamic vulcanisation (TPE-V) have substantially elastomeric properties in the range of use at lower temperatures, e.g., room temperature, and behave comparably to classic elastomers in this range. In the processing range, at a higher temperature, however, they have primarily thermoplastic properties, and accordingly are flowable and plastically deformable or heat-deformable, and have a characteristic melting point or range, or softening range. Their properties are determined here by the thermoplastic, non-crosslinked polymer matrix, e.g., of polypropylene or vinyl acetate. The elastomer particles embedded therein, which are crosslinked with one another, give rise to certain elastic properties, but have no significant influence on the heat deformability and flowability.

The compositions according to the invention, on the other hand, have almost exclusively elastomeric or rubber elastic properties over the entire relevant temperature range, both in the range of use and in the elevated temperature range, because the sulphur bonds that play a decisive role in this regard completely pervade the body. When the temperature increases, the body becomes softer, but never becomes flowable; thus, it has no melting point or range. The vulcanised polymer mixture or composition thus has no melting peak in the temperature range of up to 200° by dynamic differential calorimetry. Even after vulcanisation, no heat deformation or second moulding step is possible. Thermoplastic elastomers are thus also significantly less resistant to thermal and dynamic stresses than the advantageous compositions according to the invention, and tend to creep at elevated temperatures.

An advantageous vulcanised polymer mixture or the composition additionally has a loss factor (ratio of loss to storage modulus under dynamic shearing stress) in a range from room temperature to app. 200° C. of tan $\delta$<0.3, measured according to ISO 4664 'Elastomers or Thermoplastic Elastomers-Determination of Dynamic Properties'. This shows that, in a temperature range, in which TPE-Vs are typically processed, the elastic properties of the composition according to the invention prevail over the viscous properties, and that no additional moulding is thus possible.

A particularly advantageous composition according to the invention is produced, or can be obtained, by mixing the polymer components into a homogeneous blend, and, in particular, subsequent incorporation of the sulphur crosslinking agents, the flame retardants, and any other additives and/or excipients, whilst strictly avoiding any crosslinking and/or vulcanisation, preferably at a temperature of no more than 110° C. Only afterwards do the moulding and vulcanisation steps occur, in particular at an increased temperature and, if necessary, under pressure. The vulcanisation is not carried out under shearing stress, i.e., not during intense mixing as in dynamic vulcanisation.

The vulcanisation temperature is advantageous, in particular with EPDM/EVA, below 200° C., preferably in a range of 130-170° C. This is an additional difference from crosslinked thermoplastic elastomers, in which the crosslinking is obtained by means of dynamic vulcanisation already during mixing at high temperature and under high shearing stress. By contrast, in the composition according to the invention, vulcanisation is avoided during mixing, and the sulphur crosslinking only occurs at the end, in particular after moulding, at an elevated temperature but without shearing stress. In this way, the rubber-like properties of the composition are positively affected even at high flame retardant content. The composition that thus advantageously results can thus be obtained by 'static' vulcanisation, in particular after moulding. 'Static vulcanisation' refers here to vulcanisation that avoids any shearing stress, or that avoids dynamic vulcanisation.

According to the invention, in this regard, a method for producing an advantageous composition according to the invention is also proposed, whereby first, the polymer components, the sulphur crosslinking agent(s), the flame retardant(s) and any other additives and excipients are mixed into a homogeneous blend whilst avoiding crosslinking or vulcanisation, and thereafter at least one step of moulding, e.g., by injection (IM), is carried out. Only then, no earlier than during or at the end of moulding, in particular after completing the moulding process, is the vulcanisation carried out, as a static, non-dynamic vulcanisation that avoids shearing.

Particularly advantageous in order to avoid premature vulcanisation in this regard is for the mixing step to be carried out before moulding below a critical temperature and within a critical time period, in particular at a temperature of no more than 125° C., preferably 50-110° C. The blend or polymer contents are advantageously in a softened state during mixing.

Another advantageous procedure, also in order to avoid premature crosslinking or vulcanisation, provides for the moulding, too, to be carried out below a critical temperature and within a critical time period, in particular at a temperature of no more than 130° C., in particular 70-100° C. The actual vulcanisation then occurs advantageously at a temperature of no more than 200° C., in particular in the range of 130-170° C. Advantageously, the crosslinking occurs at a higher temperature than mixing and/or moulding, in particular also at a pressure of 100-200 bar. These steps/this procedure result in an advantageous composition having the desired characteristics.

Compared to methods according to the invention, in the prior-art 'dynamic vulcanisation', such a polymer mixture is mixed under high shearing stresses and simultaneously vulcanised, i.e., before moulding. In this way, small droplets are formed from the unsaturated elastomer, in which the crosslinking takes place. The intensive processing under high shearing stresses results in the permanent isolation of these droplets and means that no bonds or sulphur bonds form between the individual elastomer droplets. Thus, a uniform thermoplastic matrix is formed out of non-crosslinked polymer containing vinyl acetate, e.g., EVA, into which isolated islets dispersed in this thermoplastic matrix from the vulcanised elastomer are present, e.g., EPDM. No bonds are present between the individual separate elastomer particles, in particular no sulphur bonds. Thus, there are no sulphur bonds and no network of sulphur bonds pervading the entire matrix of the mixture obtained; rather, the sulphur bonds are limited to the respective elastomer particle.

By contrast, in the advantageous method according to the invention, no isolated internally crosslinked elastomer particles are formed; rather, there is an interpenetrating mixture of the chains of the polymer containing vinyl acetate and the sulphur-crosslinked elastomer chains. The polymer components are present as wide-meshed chemically linked spatial network molecules, whereby the links cannot be broken without breaking down the material. The polymer mixture is free of vulcanised elastomer particles dispersed within it, in particular of elastomer particles or rubber domains with a mean (particle) diameter of more than 0.5 microns, in particular more than 0.1 microns, preferably more than 0.01 microns.

To improve the requirements in terms of smoke density and toxicity, it is advantageous for all polymer components, in particular the composition as a whole, to be free of halogen.

According to an advantageous embodiment, it is provided for the polymer containing vinyl acetate to be a homopolymer, copolymer, or terpolymer of vinyl acetate, and in particular to be selected from the group of polyvinyl acetate (PVAc) or ethylene vinyl acetate (EVA).

A particularly low smoke gas density, together with good chemical properties, is obtained if the polymer containing vinyl acetate has a vinyl acetate content of 40-75 wt % (LP Testing Instruction no. 015, Lanxess).

Ethylene vinyl acetate is mostly used in the cable field. The polar vinyl acetate group improves the flame resistance and oil resistance at the same time. The smoke gas density is low, and the smoke gas has no toxicity. Ethylene vinyl acetate simultaneously has excellent weather, UV, ozone, and heat resistance. In this regard, it is advantageous for the polymer containing vinyl acetate to have a melting point or a melting range beginning at less than 150° C., preferably less than 100° C., and, if applicable, has a low viscosity at typical rubber processing temperatures. In this way, a good mixture can be obtained whilst simultaneously completely avoiding vulcanisation.

The unsaturated elastomer is advantageously a homopolymer, copolymer, or a terpolymer consisting of or containing diene monomer units, in particular a terpolymer consisting of ethylene, propylene, and a termonomer containing diene, preferably with a termonomer content of at least 2-12 wt % relative to the terpolymer (according to ASTM D 6047). In this way, the double bonds required for sulphur crosslinking are provided and the dynamic and elastic properties are preserved. In this regard, it is particularly advantageous for the unsaturated elastomer to be a rubber with an unsaturated side group, in particular an ethylene-propylene-diene rubber (EPDM). Ethylene-propylene-diene-monomer rubbers (EPDM) have significant advantages in the event of fire in terms of their low smoke gas density and toxicity, but are not themselves fire-resistant. However, EPDM rubbers have a high capacity for filling with fillers and softeners, and thus allow a high percentage of flame retardants to be incorporated in both solid and liquid form. The hardness and mechanical indicators of EPDM rubbers can also be adjusted in a wide range. Additionally, EPDM rubbers offer advantages in terms of weather, UV, ozone, and heat resistance, and can act as a protective layer to minimise the aging of the dynamically stressed components to be protected, which are, e.g., made of natural rubber. Preferably, it contains non-conjugated diene monomer units, selected from the group of 1,3-butadiene, 2-methyl-1,3-butadiene (isoprene), 2,3-dimethyl-1,3-butadiene, 1,3-pentadiene, 1,3-cyclopentadiene, dicyclopentadiene, 2-methyl-1,3-pentadiene, 1,3-hexadiene, 1,4-hexadiene, 1,4-cyclohexadiene, tetrahydroindene, methyl tetrahydroindene, ethylidene norbornene or 5-ethylidene-2-norbornene (ENB), 5-methylene-2-norbornene (MNB), 1,6 octadiene, 5-methyl-1,4-hexadiene, 3,7-dimethyl-1,6-octadiene, 5-isopropylidene-2-norbornene, 5-vinyl-norbornene.

It is particularly advantageous for the ethylene-propylene-diene monomer rubber (EPDM) to be a terpolymer consisting of ethylene, propylene, and 5-ethylidene-2-norbornene (ENB) or dicyclopentadiene (DCPD), preferably with a termonomer content of at least 2-12 wt % relative to the terpolymer (according to ASTM D 6047). Due to the relatively low double bond content of EPDM compared to other diene rubbers, a larger amount of accelerant must be used in order to obtain an economically worthwhile vulcanisation speed. The solubility of EPDM in sulphur and the mostly polar accelerants or accelerant residues is low. As such, usually a combination of multiple accelerants is used here in order to avoid blooming.

If protection from oils and greases is additionally required, it is also possible for the unsaturated elastomer to be a rubber of the R group with an unsaturated main chain, in particular a partially hydrated acrylonitrile butadiene rubber (HNBR). The HNBR is produced by partially hydrating an NBR. Due to the low double bond content, this rubber has the advantage of good values in terms of fire safety properties, e.g., smoke gas density, as well as excellent mechanical and dynamic indicators when used as a protective layer mixture. With regard to the use of flame retardants, the same conditions apply as for EPDM.

To form an advantageous sulphur crosslinking system, it is advantageous for the unsaturated, partially hydrated elastomer to have 94-97% hydration, resulting in a residual double bond content of 3-6% in the main chain, relative to the initial double bond content in the main chain (ASTM D 5670-95, see also D. Bruck, Kautschuk and Gummi, Kunststoffe 42(1989) 2/3).

Crosslinking with sulphur and sulphur donors requires the presence of double bonds either in the main chain or in a side chain. The length of the sulphur links and the crosslink density is determined by the ratio of sulphur, sulphur donors, and accelerants and the type of accelerants used. Commonly used accelerants include, e.g., N-cyclohexyl-2-benzothiazylsulphenamid (CBS), thiazoles, e.g., 2-mercaptobenzothiazole (MBT), dithiocarbamates, e.g., zinc dibenzyl dithiocarbamate (ZBEC), guanidines, e.g., diphenylguanidine (DPG), thiophosphates.

Sulphur donors include, e.g., thiurames, caprolactam disulphide, or phosphoryl polysulphide. The crosslink density or total crosslink density is one determining factor for the elastic properties of the protective layer mixture. It can be determined by equilibrium swelling with the Flory-Rehner equation (P. J. Flory & J. Rehner, J. Chem. Phys., 11(1943) 521). The crosslinks consist of portions of mono-, di-, and polysulphide bonds or sulphur bonds. The length of the sulphur bonds can be accurately determined using the thiolamine method. This method provides information on the length distribution of the sulphur bonds (B. Savile & A. A. Watson, Rubber Chem. Technol. 40 (1967) 100, D. S. Campbell, Rubber Chem. Technol. 43 (1970) 210).

To form a crosslinking system that positively affects the elastic and dynamic properties, it can be advantageously provided for the sulphur contained in the structure of the sulphur bonds to be contained in an amount of 0.3-2 phr (parts per hundred rubber) relative to the total amount of polymer components. In general, it is advantageous for sulphur to be contained in an amount of at least 0.5 phr relative to the total amount of polymer components.

An advantageous composition is characterised by the fact that the non-crosslinked polymer containing vinyl acetate is present in an amount of 5-15 wt %, in particular 7-12 wt %, and the unsaturated elastomer is present in an amount of 20-40 wt %, in particular 20-30 wt %, preferably 21-29 wt %, relative in each case to the total weight of the composition. In this regard, it is particularly advantageous for the polymer mixture to consist of non-crosslinked ethylene vinyl acetate (EVA) and sulphur-crosslinked ethylene-propylene-diene rubber (EPDM) as the only two polymer components, in particular in a ratio of 40-20 wt % EVA to 60-80 wt % EPDM, preferably approximately 20-30 wt % EVA to 70-80 wt % EPDM, more preferably approximately 21-29 wt % EVA to 71-79 wt % EPDM, in particular approximately 25 wt % EVA to 75 wt % EPDM, whereby the percentages respectively refer to the ratio of the pure polymer components to one another or the amount of the polymers EVA+EPDM (=100 wt %) without fillers, additives, and flame retardants. In this way, an intimate mixture of the polymer components and a nearly monophasic system are obtained.

According to a preferred further development, it is also possible for at least one polyolefin, in particular polyethylene, preferably LLDPE, or polypropylene, to be included as additional polymer components. In this way, the properties of the polymer mixture may be influenced in the desired way.

A particularly advantageous composition is as follows:
Polymer containing vinyl acetate 5-15 wt %
Unsaturated elastomer 20-40 wt %
Flame retardants 50-80 wt %
Remainder: Excipients, additives, etc.

In this regard, it is particularly advantageous for the polymer containing vinyl acetate to be ethylene vinyl acetate (EVA) and the unsaturated elastomer to be an ethylene propylene diene rubber (EPDM).

In order to obtain a good flame-retardant effect, it may be provided for the flame retardant(s) to be present in an amount of 50-80 wt %, preferably 51-79 wt %, preferably 60-70 wt %, preferably 61-69 wt % relative to the overall composition. The flame retardant content is very high in order to reliably comply with the desired fire safety standards. However, the mechanical parameters, especially the dynamic and elastic properties of the composition, are not excessively affected, and are surprisingly preserved. In this way, it is also ensured that the composition can be applied as a coating to a base, and that the advantageous mechanical properties, especially the dynamic and elastic properties, of the base are preserved, and that the base is simultaneously protected against fire and flame by the coating.

To obtain good fire safety properties with minimal effect on the material properties, it has been shown to be advantageous to use magnesium hydroxide (MDH), aluminium hydroxide (ATH), antimony hydroxide, nanoclays, and/or zinc borate as flame retardants, preferably a synergistic mixture of two or more thereof. In particular, the flame retardant(s) are solid and powdery or crystalline. However, in order to be effective, the flame retardants must be added in large amounts, and thus have a severe adverse effect on the mechanical properties, e.g., tensile strength, ultimate elongation, tear resistance, elasticity, of mixtures thus prepared.

To obtain additional desired or required properties of the flame-retardant or anti-fire safety coating, it is additionally proposed for the coating to contain additional additives, e.g., fillers or colourants, in particular carbon black, processing aids, anti-aging agents, etc. When using softeners, phosphoric acid esters, which, due to their polarity, have only limited compatibility with non-polar rubbers, can be used.

The composition according to the invention advantageously has the following indicators, i.e., a hardness of 50-75, preferably 55-65, Shore A (DIN ISO 7619-1) and/or an ultimate elongation of 200-600%, preferably 350-600% (DIN 53504), and/or a tear resistance of >7 N/mm, preferably >9 N/mm (DIN ISO 34-1 B). This shows that, despite the high flame retardant content, the indicators essential to the dynamic and elastic properties are preserved and met.

The invention further concerns a flame-retardant article. This article may consist exclusively of the composition according to the invention, e.g., as a moulding. Alternatively, such an article may only partially comprise this composition, e.g., in the form of a coating on a base, e.g., on a fabric.

The invention further concerns an elastic composite element, suited for oscillation and vibration damping and suspension, having a base that has a coating consisting of this composition in at least some parts or sections of its outer surface, or on the entire outer surface.

Advantageously, it is provided for the base to consist primarily of rubber, e.g., polybutadiene rubber, styrene butadiene rubber, acrylonitrile rubber, ethylene-propylene-diene rubber, sponge rubber, or mixtures thereof, preferably of natural rubber. Additionally, the required elastic or dynamic properties of the base of the elastic element are preferably enhanced by adding to the base fillers or reinforcing agents, plasticisers, vulcanisation accelerants, cross-linking agents, anti-aging agents, etc. in a known manner.

According to a preferred further development, it is provided for the coating to be attached to the base in a fixed and inseparable manner, whereby the coating is applied to the base preferably by manufacture, extrusion, pressing, spraying, and subsequent coextrusion. The overall methods allow for simple, reliable production of the elastic composite element consisting of the base and the flame-retardant or fire-resistant coating whilst producing a reliable bond between the base and the coating. In addition to producing the composite element in a one-step process, multi-step processes may also be selected, in particular to adapt the process to the materials selected for the base and the coating. Taking into account the materials used, according to the invention, it is additionally preferably proposed for the production to take place at temperatures below 200° C., in particular between 130 and 170° C.

It has proved sufficient for the coating to have a relatively low thickness of less than 10 mm, in particular 1-5 mm. However, the anti-fire safety properties are reliably obtained with minimal, if any, compromise of the elastic properties of the base.

An advantageous composite element with negligible compromise of the elastic properties of the base is characterised by the fact that the coating constitutes 1-20 wt %, in particular 2-16 wt % of the elastic composite element.

According to the invention, it may additionally be provided for the base to have a reinforcement, e.g., fibres, in particular glass fibres, polymer fibres, CFK fibres, GFK fibres, a fabric, etc.

The invention further concerns the advantageous use of an elastic composite element according to one of the foregoing claims as a spring element, damping element, gasket, hose, mat, moulding, protective clothing, etc., or a component thereof. Advantageously, the article may also be used as an elastomer profile, in particular one configured as an endless section, in particular for windows or as a gasket between the frame and the glass.

Examples for the Composition According to the Invention:

Example Formulations:

| Example A | Wt % |
|---|---|
| Ethylene vinyl acetate | 12 |
| Ethylene-propylene-diene rubber | 30 |
| Flame retardants | 55 |
| Accelerants | 1.2 |
| Crosslinking agent (sulphur) | 0.8 |
| Activator and processing aid | 1 |

The fire- or flame-resistant coating described in example A shows a basic qualitative and quantitative formulation for an advantageous composition. This is characterised by good fire safety properties, whereby in particular a low smoke gas density can be obtained in case of fire. Such a coating is used especially in elastic elements or components in which, e.g., persons are exposed to gases or smoke in the event of fire.

The following examples 1-5 show detailed exemplary formulations:

| Trade name | Description | Ex 1 | Ex 2 | Ex 3 | Ex 4 | Ex 5 |
|---|---|---|---|---|---|---|
| Vistalon 6505 | EPDM, ENB: 9.2% | 23 | 23 | 20 | 23 | 23 |
| Levapren 600 | EVA with 60 wt % VAC | 7 | 7 | 10 | 7 | 7 |
| Magnifin H10 | $Mg(OH)_2$, $d_{50}$ = 0.9 μm (laser diffraction) | 50 | 50 | 50 | | |
| MAGNIFINO H-10 A | $Mg(OH)_2$, silanised, $d_{50}$ = 0.9 μm (laser diffraction) | | | | 50 | |
| APYRAL 40CD | Al $(OH)_3$, $d_{50}$ = 1.3 μm (laser diffraction) | | | | | 50 |
| Firebrake ZB | Zinc borate | 9 | 9 | 9 | 9 | 9 |
| RuB N 550 | Carbon black | 1 | 1 | 1 | 1 | 1 |
| Disflamol TOF | Tris-(2-ethylhexyl)-phosphate (TOF) | 5 | 5 | 5 | 5 | 5 |
| ZnO | Zinc oxide, (BET 5m²/g) | 2 | 2 | 1.7 | 2 | 2 |
| Stearic acid | Octadenanoic acid | 0.5 | 0.5 | 0.5 | 0.5 | 0.5 |
| TMQ | 2,2,4-Trimethyl-1,2-dihydroquinoline | 0.3 | 0.3 | 0.3 | 0.3 | 0.3 |
| ZMTI | Zinc 2-mercaptotoluimidazoel | 0.2 | 0.2 | 0.2 | 0.2 | 0.2 |
| Mahlschwefel | Sulphur | 0.5 | 0.45 | 0.4 | 0.5 | 0.5 |
| Deovulc BG 187 | Accelerant mixture | 1.5 | | 1.2 | 1.5 | 1.5 |
| CBS | N-Cyclohexyl-2-benzothiazyl sulphenamide | | 0.65 | | | |
| ZBEC | Zinc dibenzyl dithiocarbamate | | 0.5 | | | |
| MBTS | 2,2'-Dibenzothiazyl disulphide | | 0.2 | | | |
| MBT | 2-Mercaptobenzothiazole | | 0.2 | | | |

All percentages are relative to the total weigh of the mixture. Exemplary formulation 4 with silanised Mg hydroxide has improved resistance properties compared to exemplary formulation 1 due to the silanisation. Exemplary formulation 5 has different flame protection to exemplary formulation 1 in that the dehydration occurs at lower temperatures.

All exemplary formulations 1-5 and test panels consisting of them can, in themselves, comply with the requirements of standard CEN TS 45545-2 and protect (preferably) dynamically and statically stressed articles from fire as a cover layer in a thickness range of 2-10 mm, preferably 4-6 mm. Covulcanisation and the resultant good attachment to the core material results in secure protection over the entire lifetime without affecting the dynamic characteristics, e.g., spring characteristics, of the entire moulded article. Composites 1 coated with one of the compositions generated from the exemplary formulations 1-5 meet all fire safety standards CEN TS 45545-2.

Production of a Composition According to the Invention from Exemplary Formulation 1:

Exemplary formulation 1 is produced either in a rolling mill or an internal mixer. In rolling mills, the sequence is as follows: EPDM and EVA are mixed until a smooth rolled sheet has been formed. The process is carried out without cooling the rollers. In order to ensure homogeneity, before adding the additives, the mixed sheet is alternatingly cut three times from the left and the right up to approximately ¾ of the roller width at an angle of approximately 45°, and the mixture thus removed is applied to the other side ('cutting'). Before the beginning of the mixing process of the other components, the water cooling of the rollers is turned on. The solid and liquid additives are added continuously in small amounts with constant gap adjustment. If the rubber has received all of the materials, homogenisation is carried out by cutting. The rolled sheet is placed in front of the roller and intermediately stored for 10 min at room temperature in order to cool the mixture and the rollers. The accelerants are added together with the sulphur. If the accelerants and the sulphur have been absorbed into the mixture, the mixture is cut three times on the left and right again. Then, the mixture is completely removed from the roller and dropped six times. Intermittently, the rolled sheet is placed in and perpendicular to the direction of the roller. Then, the rolled sheet is removed at the desired thickness.

If an internal mixer is used, the sequence is as follows: The mixing chamber is tempered to 50° C.±5° C. before the beginning of the mixing process. First, EPDM and EVA are added and kneaded for 120 s with the die lowered. Then, the solid and liquid additives are added. The die is lowered, and the mixture is kneaded for another 120 s. Then, the die is cleaned, and the mixture is mixed again for no more than 60 s or until a melt temperature of 100° C. in the mixing chamber is reached, and then ejected. The mixture is cooled and homogenised in a downstream rolling mill by means of a stock blender. The cooling water temperature at the inlet is no more than 30° C. When the mixture reaches a temperature of approximately 80° C.±5° C., the accelerant is added. After rehomogenisation with the stock blender (5 cycles), the mixed sheet is removed from the roller and stored on a transport carriage until further processing.

Exemplary formulation 1 was produced in an internal mixture of type LH 50 A (manufactured in 1961) according to the above method at a speed of the tangent blades of 30 rpm. After the ejection of the mixture at 100° C., the mixture was cooled on a rolling mill as described above (Berstorff 1500 mm), and the accelerant is mixed in. Mixed sheets with a thickness of 4 mm are taken from the roller and stored on a transport carriage until further processing.

The composition 1 was vulcanised in an electric press at 155° C., 15 min at a pressure of 200 bar, in any case after moulding and avoiding any shearing stress. Mechanical indicators of the composition thus obtained from exemplary formulation 1:

Shore A (DIN ISO 7619-1): 67
Ultimate elongation (DIN 53504): 350%
Tear resistance (DIN ISO 34-1 B): 10 N/mm In particular the high ultimate elongation value has the advantage that the deformations of the component to be protected are permanently tolerated by the coating layer. Additionally, compression sets of 40% are obtained at 70° C. (DIN ISO 815-B).

Fire safety values of the composition thus obtained from exemplary formulation 1: The fire safety properties were evaluated according to CEN TS 45545-2, with the following results:

Smoke gas density (ISO 5669-2): Ds,max=220
Smoke gas toxicity (ISO 5669-2): CIT (after 4 min): 0.051/CIT (after 8 min): 0.074
Heat release rate (ISO 5660-1): MARHE=81 kW/m2

Sulphur Bond Analysis of the Composition thus Obtained from Exemplary Formulation 1:

A crosslink density determination on exemplary formulation 1 was carried out by equilibrium swelling. A test panel, 2 mm, was used as a sample; vulcanisation occurred at 155° C., 15 min, 200 bar in an electric press. The test bodies were stamped from the vulcanised panel, and had a diameter of app. 8 mm.

In addition to the crosslink density [mol/cm3] formed by the sulphur bonds, the method also detects the link density of the filler net (see: B. Saville, A. A. Watson, Rubber Chem. Technol. 40(1967) 100). Both the total crosslink density and the distribution of the mono-, di-, and polysulphide nodes were studied.

The total crosslink density was determined in triplicate by swelling measurements with the following parameters: Swelling Agents: 20 ml toluene, vulcanisate weight (relative to polymer and fillers): app. 0.05-0.2 g; room temperature. The test duration was determined by reaching the equilibrium setting of the swelling process, which is tested gravimetrically. The test was carried out in triplicate in each case. The evaluation and calculation of the crosslink density was carried out according to Flory-Rehner, whereby a concentration-independent Flory-Huggins parameter (c) of 0.3 was used. To determine the mono- and disulphide bond density S1 and S2, the vulcanisate was subjected to a degradation reaction with iso-propanethiol in a piperidine/heptane mixture at room temperature for two hours. The reaction occurred under inert gas ($N_2$). After the degradation reaction, the sample material was rinsed with benzene, dried, and subjected to swelling measurements. The result was the crosslink density, determined by S1 and S2 bonds. Subtracting this value from the total crosslink density results in the proportion of polysulphide Sx bonds.

To determine the monosulphide bond density S1, the vulcanisate was subjected to a degradation reaction with hexanethiol in piperidine for two days under vacuum. After rinsing with benzene, the remaining crosslink density was determined as above, which is represented only by S1. Subtracting this value from the results of the previous measurements results in the proportion of S2 and Sx.

The relative measurement error of the method averaged app. ±5% per bond type at an average limit of determination for the crosslink density of $-1.5*10^{-5}$ mol/cm$^3$.

| | |
|---|---|
| Total crosslink density: | 2.2 +/− 0.0 × $10^{-4}$ mol/cm$^3$ |
| S1 | 0.9 +/− 0.0 × $10^{-4}$ mol/cm$^3$ |
| S2 | 0.3 +/− 0.1 × $10^{-4}$ mol/cm$^3$ |
| Sx | 1.0 +/− 0.1 × $10^{-4}$ mol/cm$^3$ |

The composition thus obtained can thus be subjected to moulding and then vulcanised, and this form can be used without further processing as a flame-retardant article, e.g., a profile. Alternatively, however, the composition thus obtained can be processed into a composite element and only vulcanised into a finished product thereafter.

Examples for the composite element 1 according to the invention:

BRIEF DESCRIPTION OF THE DRAWING

The composite element 1 according to the invention is described in greater detail below based on exemplary embodiments shown schematically in the drawings by way of example only and without limitation.

FIG. 1 shows a schematic cross-section of a composite spring as a first embodiment of an elastic composite element according to the invention.

FIG. 2 shows, in a representation similar to FIG. 1, a schematic cross-section of a composite element consisting of a buffer or socket;

FIG. 3 shows a schematic cross-section of a composite element consisting of a bellows;

FIG. 4 shows a schematic cross-section of a rolling lobe of an air spring as a composite element;

FIG. 5 shows a schematic cross-section of a flat store of a secondary spring as a composite element;

FIG. 6 shows a schematic cross-section of a buffer as a composite element;

FIG. 7 shows a schematic cross-section of a socket or guide bushing as a composite element;

FIG. 8 also shows a schematic cross-section of a bearing or bush as a composite element;

FIGS. 9 and 10 each show a schematic cross-section of various embodiments of a buffer or sealing element as a composite element;

FIG. 11 shows a schematic cross-section of a deep tension spring or auxiliary spring as a composite element;

FIG. 12 shows a schematic cross-section of a layer spring or auxiliary spring as a composite element;

FIGS. 13 and 14 each show a schematic cross-section of various embodiments of a hollow spring as a composite element;

FIG. 15 shows a schematic cross-section of a buffer or auxiliary spring as a composite element;

FIG. 16 shows a schematic partial cross-section of a hose as a composite element.

DETAILED DESCRIPTION OF PREFERRED EMBODIMENTS

In the drawings, a wide variety of embodiments of elastic composite elements 1 is shown, each of which consists of a base 2 consisting primarily of rubber, whereby the composite element 1 can withstand dynamic stress. Additionally, the composite elements 1 shown in the drawings each have the flame-retardant or fire-resistant coating 4 according to the invention on at least part of their outer surfaces 3, which is arranged, in particular, on areas facing the outside of the respective composite element 1. Examples of material compositions for the various configurations of bases 2 are provided after a description of the drawings.

FIG. 1 shows a schematic cross-section of a composite spring as a composite element 1, whereby a metallic spring element 5 is arranged in a base 2. In exposed areas, or areas of the surface 3 facing the outside, a flame-retardant or fire-resistant coating 4 with the characteristics according to the invention is additionally provided.

In the buffer or socket composite element 1 schematically shown in FIG. 2, a base 2, which, in turn, consists of an elastic material, primarily rubber, is also provided over areas of its surface 3 with the coating 4.

In the bellows shown in FIG. 3 as a composite element 1, it can be seen that substantially its entire outward surface 3 has the coating 4, whereby the base of the bellows is designated 2.

Likewise, in FIG. 4, which shows a bellows of a rolling lobe of an air spring, it can be seen that the base 2 has the coating 4 on its entire outer surface 3.

In the flat store schematically shown in FIG. 5 as a composite element 1, it can also be seen that the base 2 substantially has the coating 4 according to the invention substantially over its entire surface.

In the case of the buffer or bearing shown schematically in FIG. 6, on the other hand, a coating 4 is provided only in some areas on the elastic base 2.

In the case of the socket or guide bushing of FIG. 7, it can be seen, in turn, that the base 2 has the coating 4 on substantially its entire outward surface 3, whereby an insert 6 is additionally provided.

Likewise, in the case of the socket shown in FIG. 8, the base 2 has the coating 4 on its entire outward surface 3, whereby another insert 6 is additionally provided.

FIGS. 9 and 10 show different embodiments of a buffer as a composite element 1, whereby both in the configuration of FIG. 9 and in the configuration of FIG. 10, the base 2 is covered with a coating 4.

In the case of the deep tension spring or auxiliary spring shown in FIG. 11, a base 2 is at least partially provided with the coating 4.

The layer spring or auxiliary spring shown in FIG. 12 is similar, whereby the bases 2 each have a coating 4.

In the schematic representations of FIGS. 13 and 14, it can be seen that various embodiments of a base 2 each have a coating 4 substantially on the entire outward surface 3.

The primary spring or auxiliary spring shown in FIG. 15 is similar, whereby the bases 2 each have a coating 4.

Additionally, FIG. 16 schematically shows a partial area of an elastic hose as a composite element 1, whereby the elastic base 2 is provided with the coating 4 for fire safety purposes.

In addition to the uses for an elastic composite element 1 shown in the drawings as a spring element, damping element, a shock absorber element, hose, or bearing element, an element consisting of a base 1 and the flame-retardant or fire-resistant coating 4 according to the invention may also be used as a gasket, moulding, mat, or protective clothing, e.g., protective gloves.

Examples for the Base 2 of the Composite Element 1:

To form the base 2, which primarily consists of rubber, for various purposes, a number of exemplary formulations are listed below for appropriate material properties, whereby the percentages refer to weight unless otherwise stated.

|  | GK 1<br>50 ShA | GK 2<br>60 ShA | GK 3<br>70 ShA |
| --- | --- | --- | --- |
| Natural rubber | 57 | 51 | 48 |
| Filler and reinforcer | 33 | 41 | 45 |
| Plasticiser | 1.5 | 0.7 | 0.2 |
| Accelerant and Crosslinking agent (sulphur) | 2.5 | 2.2 | 2.0 |
| Anti-aging agent | 1 | 0.9 | 0.8 |
| Activator | 3 | 2.5 | 2.4 |
| Processing aid | 2 | 1.7 | 1.6 |

|  | GK 4<br>55 ShA | GK 5<br>60 ShA | GK 6<br>65 ShA |
| --- | --- | --- | --- |
| Acryl-nitrile-butadiene rubber | 58 | 53 | 48 |
| Carbon black (Filler and reinforcer) | 20 | 27 | 34 |
| Plasticiser | 15 | 12 | 10 |
| Accelerants + Crosslinking agent (sulphur donor) | 2.50 | 2.50 | 2.50 |
| Activator | 2.50 | 2.50 | 2.50 |
| Processing aid | 2 | 3 | 3 |

|  | GK7<br>65 ShA |
| --- | --- |
| Natural rubber | 25 |
| Styrene-butadiene rubber | 15 |
| Bromobutyl | 10 |
| Fillers | 42 |
| Accelerants | 1.0 |
| Crosslinking agents | 1.5 |
| Activators | 3.50 |
| Processing aid | 2 |

In the tables above, various examples GK 1-GK 7 are listed for bases 2 with various Shore hardnesses A.

The exemplary embodiments according to GK 1, 2, and 3 are highly elastic rubber materials for use in a dynamic or highly dynamic application, e.g., as primary and secondary springs, as shown, e.g., in FIG. 1, FIG. 5, FIG. 6, FIG. 12, or FIG. 15. The base 2 of the elastic elements according to GK 4, 5, and 6 are characterised in particular by high resistance to external contamination such as mineral oil, and can be used, e.g., in combination with sockets or bearings, as is the case for the exemplary embodiments according to FIG. 7, 8, or FIG. 11. In example 7, a base 2 of an elastic composite element 2 with good energy-absorbent properties is provided, whereby such material properties can be used, in particular, for the hollow springs shown in FIGS. 13 and 14.

Method for Producing a Composite Element 1 according to the invention: The production of the flame-resistant, dynamic stress resistant composite element 1 may be carried out by various methods known to persons skilled in the art. The required thickness of the coating 4 may be obtained by calendering or extrusion or direct injection (IM) or pressing (TM, CM) onto the base 2 to be coated.

The coating 4 may be applied in various pressing methods.

On the one hand, the protective layer mixture of the composition may be directly applied by the roller mill by assembly to a preform of the rubber mixture, produced by extrusion (e.g., Barwell) or by strip cutting. Then, the semi-finished product may be jointly vulcanised by compression moulding. Alternatively, a pre-vulcanised or vulcanised article may, after appropriate pretreatment of the surface 3, e.g., washing with solvents and/or roughening and any adhesive coating, may be coated or sprayed with the not yet vulcanised composition or coating 4 according to the invention, which can be vulcanised onto the article or base 2 to be protected.

Flat products, with or without strengthening inserts, may have, e.g. calendering webs of the flame retardant mixture according to the invention applied to them and vulcanised under pressure in presses or autoclaves. When producing, e.g., hoses or profiles by extrusion, the flame-retardant mixture according to the invention may be continuously applied by means of a second extruder to the extruded core or base 2 to be protected and vulcanised together with it.

The advantageous sulphur crosslinking system, like all other methods, allows he vulcanisation speeds of the base 2 and the protective mixture applied to be adjusted such that optimal covulcanisation, and thus an optimal bond, can be obtained. At the same time, all continuous vulcanisation lines commonly used in extrusion may be used, e.g., UHF, HL, IR, salt bath.

Vulcanisation occurs at a temperature of less than 200° C., preferably 130-170° C. The vulcanisation times depend on the production method and the geometry of the component. In the case of joint covulcanisation, the vulcanisation characteristics of the core material used also determine the heating conditions, which are known to persons skilled in the art.

Example of Production of a Composite Element 1

In the example below, an elastic bearing having the dimensions 100×100×50 mm is produced as a composite element 1. The core mixture of the base 2 is a natural rubber mixture having the following properties when vulcanised:

Hardness: 60 Shore A (DIN ISO 7619-1)
Tensile strength: 18 N/mm2 (DIN 53504)
Ultimate elongation: 470° A, (DIN 53504)
Spring stiffness: 1702 N/mm The spring stiffness is determined on a universal testing machine between two planoparallel pressure plates. The spring stiffness determination is preceded by five deflections up to a pitch of 20 mm at a speed of 200 mm/min. The spring stiffness is determined in the linear range between 5 and 10 mm pitch.

The core mixture is prevulcanised, and the finished core or base 2 has the dimensions 92×92×42 mm. The moulding and prevulcanisation occur at a temperature of 155° C., a heating time of 40 min, and a pressure of 200 bar in the CM method in the electrically heated press. The demoulded core is cleaned with acetone, and the protective layer (exemplary formulation 1) is applied on all sides of the base 2 in a thickness of 4 mm. The final moulding and vulcanisation of the composite are carried out by the CM method at a temperature of 155° C., a heating time of 15 min, and a pressure of 200 bar. After vulcanisation, the composite element 1 is cooled at room temperature, and the excess was mechanically removed. The spring stiffness is termined on the composite bearing consisting of core material and exemplary mixture 1 (see conditions for core material).

The spring stiffness of the composite element 1 is 1680 N/mm, only slightly below the spring stiffness of the base 2. Additionally, within CEN TS 45545-2, the heat release rate of the component according to ISO 5660-1 with ARHE=66 kW/m2 is determined.

The invention claimed is:
1. A flame-resistant polymer composition, comprising:
a thermoplastic polymer containing vinyl acetate;
an unsaturated elastomer containing double bonds; and at least one flame retardant or a combination of flame retardants, said thermoplastic polymer and said unsaturated elastomer intermixed to form a homogenous mixture, said homogenous mixture vulcanised exclusively with sulphur or a sulphur-containing crosslinking agent so that a continuous system of sulphur crosslinks extends uninterruptedly through an entirety of the mixture.

2. The composition of claim 1, wherein the thermoplastic polymer is non-crosslinked, and the unsaturated elastomer is at least partially crosslinked via the sulphur crosslinks, and wherein the mixture does not contain crosslinks except the sulphur crosslinks.

3. The composition of claim 1, wherein chains of the thermoplastic polymer and sulphur-crosslinked chains of the elastomer spatially overlap one another.

4. The composition of claim 1, wherein the sulphur crosslinks include polysulphide and mono-and di-sulphide bonds, wherein a content of the polysulphide bonds is between 40 and 50%, and a content of the mono- and di-sulphide bonds is between 50 and 60%, relative to a total crosslink density of the mixture.

5. The composition of claim 1, wherein the mixture is substantially monophasic.

6. The composition of claim 1, wherein in a vulcanised state the homogenous mixture has elastomeric properties at a range of 150-200° C.

7. The composition of claim 1, wherein in a vulcanized state the homogenous mixture has no melting peak measured by dynamic differential calorimetry in a temperature range of up to 200° C.

8. The composition of claim 1, wherein in a vulcanized state the homogenous mixture has a loss factor defined as a ratio of loss to storage modulus in dynamic shearing stress of tan δ<0.3 in a temperature range from room temperature up to 200° C.

9. The composition of claim 1, further comprising at least one of additives and excipients, said composition being produced by
mixing the thermoplastic polymer and the unsaturated elastomer to form the homogeneous mixture,
adding the sulphur or the sulphur-containing crosslinking agent, the flame retardants, and the additives and/or excipients, whilst strictly avoiding any crosslinking and/or vulcanisation,
after adding the sulphur or the sulphur-containing crosslinking agent, moulding and vulcanizing the mixture, wherein the vulcanizing is performed in absence of shearing stress.

10. The composition of claim 1, produced by static vulcanisation, in the absence of shearing stress or dynamic vulcanisation.

11. The composition of claim 1, wherein the thermoplastic polymer and the unsaturated elastomer are free of halogen.

12. The composition of claim 1, wherein the thermoplastic polymer is a homopolymer, copolymer, or terpolymer of vinyl acetate.

13. The composition of claim 1, wherein the thermoplastic polymer has a melting point or a melting range beginning at less than 150° C.

14. The composition of claim 1, wherein the thermoplastic polymer has a vinyl acetate content of 40-75 wt %.

15. The composition of claim 1, wherein the unsaturated elastomer is a homopolymer, copolymer, or a terpolymer consisting of or containing diene monomer units.

16. The composition of claim 1, wherein the unsaturated elastomer is a rubber with an unsaturated side group or an ethylene-propylene-diene rubber (EPDM) containing non-conjugated diene monomer units, selected from the group of 1,3-butadiene, 2-methyl-1,3-butadiene (isoprene), 2,3-dimethyl-1,3-butadiene, 1,3-pentadiene, 1,3-cyclopentadiene, dicyclopentadiene, 2-methyl-1,3-pentadiene, 1,3-hexadiene, 1,4-hexadiene, 1,4-cyclohexadiene, tetrahydroindene, methyl tetrahydroindene, ethylidene norbornene or 5-ethylidene-2-norbornene (ENB), 5-methylene-2-norbornene (MNB), 1,6 octadiene, 5-methyl-1,4-hexadiene, 3,7-dimethyl-1,6-octadiene, 5-isopropylidene-2-norbornene, 5-vinyl-norbornene (VNB), wherein the ethylene-propylene-diene rubber (EPDM) is a terpolymer consisting of ethylene, propylene, and 5-ethylidene-2-norbornene (ENB) or dicyclopentadiene (DCPD).

17. The composition of claim 1, wherein the unsaturated elastomer is a rubber with an unsaturated main chain, wherein the unsaturated elastomer is partially hydrated and has a degree of hydration of 94-97%, and, prior to crosslinking, has a residual double bond content of 3-6% in the main chain relative to the initial double bond content in the main chain.

18. The composition of claim 1, wherein the sulphur that forms the sulphur crosslinks is contained in the composition in an amount of 0.3-2 phr (parts per hundred rubber) relative to a total amount of polymer components.

19. The composition of claim 18, wherein the sulphur is contained in an amount of at least 0.5 phr relative to a total amount of the polymer components.

20. The composition of claim 1, wherein the thermoplastic polymer is non-crosslinked and is present in an amount of 5-15 wt %, and the unsaturated elastomer is present in an amount of 20-40 wt %, relative in each case to the total weight of the composition.

21. The composition of claim 1, wherein the thermoplastic polymer mixture is non-crosslinked ethylene vinyl acetate (EVA) and the sulphur-crosslinked ethylene-propylene-diene rubber (EPDM) at a ratio of 40-20 wt % EVA to 60-80 wt % EPDM.

22. The composition of claim 1, further comprising at least one polyolefin selected from the group consisting of polyethylene and polypropylene.

23. The composition of claim 1, wherein the flame retardant(s) is/are present in an amount of 50-80 wt %, relative to the overall composition.

24. The composition of claim 1, further comprising at least one of magnesium hydroxide (MDH), aluminium hydroxide (ATH), and zinc borate.

25. The composition of claim 1, wherein the polymer containing vinyl acetate is present in an amount of 5-15 wt %, the unsaturated elastomer is present in an amount of 20-40 wt %, the flame retardant or flame retardants is/are present in an amount of 50-80 wt %, the remainder being excipient and additives.

26. The composition of claim 1, having a hardness of 50-75, Shore A, and/or an ultimate elongation of 200-600% and/or a tear resistance of >7 N/mm.

27. A method for producing a flame-resistant composition, comprising the steps in the order of:
mixing a thermoplastic polymer containing vinyl acetate, an unsaturated elastomer, a crosslinking agent, a flame retardant, and additives and excipients into a homogeneous mixture whilst avoiding crosslinking and/or vulcanisation,
moulding the mixture, and
vulcanizing the mixture during or at the end of moulding, as a static, non-dynamic vulcanisation that avoids shearing exclusively with sulphur or a sulphur-containing crosslinking agent so that a continuous system of sulphur crosslinks extends uninterruptedly through an entirety of the mixture.

28. The method of claim 27, wherein the mixing is carried out at a temperature of no more than 125° C.

29. The method of claim 27, wherein the moulding is carried out at a temperature of no more than 130° C.

30. The method claim 27, wherein the vulcanisation occurs at a temperature of no more than 200° C. and at a pressure of 100-200 bar.

31. A flame-retardant article comprising a composition comprising a thermoplastic polymer containing vinyl acetate, an unsaturated elastomer containing double bonds, and at least one flame retardant or a combination of flame retardants, said thermoplastic polymer and said unsaturated elastomer intermixed to form a homogenous mixture, said homogenous mixture vulcanised exclusively with sulphur or a sulphur-containing crosslinking agent so that a continuous system of sulphur crosslinks extends uninterruptedly through an entirety of the mixture.

32. An elastic flame-retardant composite element, suited for vibration damping and suspension, said elastic flame-retardant composite element having a base, with at least a portion of an outer surface of the base having a coating made of a composition as set forth in claim 1.

33. The composite element of claim 32, wherein the base is made primarily of rubber.

34. The composite element of claim 32, wherein the coating is fixedly and inseparably attached to the base and is applied to the base by one of manufacture, extrusion, pressing, spraying, and subsequent coextrusion.

35. The composite element of claim 32, wherein the coating has a thickness of less than 10 mm.

36. The composite element of claim 32, wherein the coating has a weight percentage of 1-20 wt % of the elastic composite element.

37. The composite element of claim 32, wherein the base has a reinforcement selected from the group consisting of fibres, glass fibres, polymer fibres, CFK fibres, GFK fibres, and a fabric.

38. An article, comprising the composite element of claim 32, wherein the article is a spring element, damping element, gasket, hose, mat, moulding, protective clothing, or elastomer profile.

39. The flame-resistant polymer composition of claim 2, wherein the sulfur crosslinks include at least one of mono-, di-, and polysulphide bonds.

40. The flame-resistant polymer composition of claim 5, wherein the polymer mixture is free of elastomer particles or rubber domains with a mean diameter of more than 0.5 microns.

41. The flame-resistant polymer composition of claim 9, wherein the sulphur or sulphur containing crosslinking agent is added at a temperature of no more than 110° C.

42. The flame-resistant polymer composition of claim 11, wherein the composition is free of halogen.

43. The flame-resistant polymer composition of claim 12, wherein the polymer containing vinyl acetate is selected from the group consisting of polyvinyl acetate (PVAc) and ethylene vinyl acetate (EVA).

44. The flame-resistant polymer composition of claim 15, wherein the unsaturated elastomer is a terpolymer consisting of ethylene, propylene, and diene.

45. The flame-resistant polymer composition of claim 44, wherein the diene has a content of at least 2-12 wt % relative to the terpolymer.

46. The flame-resistant polymer composition of claim 24, wherein the flame retardants are solid and powdery or crystalline.

47. The composition of claim 4, wherein the content of the polysulphide bonds is 45%, and the content of the mono- and di-sulphide bonds is 55%, relative to the total crosslink density of the mixture.

48. The composition of claim 1, wherein the thermoplastic polymer has a melting point or a melting range beginning at less than 100° C.

49. The composition of claim 17, wherein the unsaturated elastomer is a partially hydrated acrylonitrile butadiene rubber (HNBR).

50. The composition of claim 20, wherein the thermoplastic polymer is present in an amount of 7-12 wt %, and the unsaturated elastomer is present in an amount of 20-30 wt %, relative in each case to the total weight of the composition.

51. The composition of claim 21, wherein the ratio is approximately 20-30 wt % EVA to 70-80 wt % EPDM.

52. The composition of claim 22, wherein the polyethylene is LLDPE.

53. The composition of claim 1, wherein the flame retardant(s) is/are present in an amount of 60-70 wt %, relative to the overall composition.

54. The composition of claim 1, having a hardness of 55-65, Shore A, and/or an ultimate elongation of 350-600% and/or a tear resistance of >9 N/mm.

55. The method of claim 27, wherein the mixing is carried out at a temperature of 50-110° C.

56. The method of claim 27, wherein the moulding is carried out at a temperature of 70-100° C.

57. The method claim 27, wherein the vulcanisation occurs at a temperature which is higher than a temperature during mixing or moulding.

58. The method claim 30, wherein the vulcanisation occurs at a temperature of 130-170° C.

59. The composite element of claim 33, wherein the rubber is selected from the group consisting of polybutadiene rubber, styrene butadiene rubber, acrylonitrile rubber, ethylene-propylene-diene rubber, sponge rubber, any mixture thereof, and natural rubber.

60. The composite element of claim 32, wherein the coating has a thickness of 1-5 mm.

61. The composite element of claim 32, wherein the coating has a weight percentage of 2-16 wt % of the elastic composite element.

* * * * *